United States Patent
Mogensen et al.

(10) Patent No.: US 10,302,069 B2
(45) Date of Patent: *May 28, 2019

(54) TOOL AND A METHOD FOR MOVING A WIND TURBINE DRIVETRAIN COMPONENT

(71) Applicant: Vestas Wind Systems A/S, Aarhus N. (DK)

(72) Inventors: Morten Mogensen, Hvidovre (DK); Bendt Høeg, Galten (DK)

(73) Assignee: Vestas Wind Systems A/S, Aarhus N. (DK)

( * ) Notice: Subject to any disclaimer, the term of this patent is extended or adjusted under 35 U.S.C. 154(b) by 234 days.

This patent is subject to a terminal disclaimer.

(21) Appl. No.: 15/620,217

(22) Filed: Jun. 12, 2017

(65) Prior Publication Data
US 2017/0276121 A1    Sep. 28, 2017

Related U.S. Application Data

(62) Division of application No. 13/994,644, filed as application No. PCT/DK2011/050451 on Nov. 25, 2011, now Pat. No. 9,709,038.

(30) Foreign Application Priority Data

Dec. 15, 2010   (DK) ................. 2010 01126

(51) Int. Cl.
*F03D 15/00* (2016.01)
*F03D 13/40* (2016.01)
(Continued)

(52) U.S. Cl.
CPC ............ *F03D 13/40* (2016.05); *F03D 13/10* (2016.05); *F03D 15/00* (2016.05); *F03D 80/00* (2016.05);
(Continued)

(58) Field of Classification Search
CPC .......... F03D 1/001; F03D 1/003; F03D 11/00; F03D 15/00; F03D 80/00
See application file for complete search history.

(56) References Cited

U.S. PATENT DOCUMENTS 3,665,148 A * 5/1972 Yasenchak ........... B23K 11/318
                                                         219/124.4
6,796,199 B2 * 9/2004 Kurz ..................... B23Q 5/402
                                                          74/424.71

(Continued)

FOREIGN PATENT DOCUMENTS

CN      101479470 A    7/2009
EP       2146090 A2    1/2010
(Continued)

OTHER PUBLICATIONS

The State Intellectual Property Office of China, First Notification of Office Action in CN Application No. 201180064923.8, dated Jan. 30, 2015.
(Continued)

*Primary Examiner* — Woody A Lee, Jr.
(74) *Attorney, Agent, or Firm* — Wood Herron & Evans LLP

(57) ABSTRACT

The invention includes a tool for moving a drivetrain component in a nacelle of a horizontal axis wind turbine, the nacelle comprising a nacelle structure, the component being connected, in operation of the wind turbine, to a rotor of the wind turbine, the tool comprising at least one carrier adapted to be connected to the component, to carry the weight of the component, and to be supported by the nacelle structure, and at least one drive unit adapted to be connected to the nacelle structure and to the carrier, so as to provide a force between the nacelle structure and the carrier, so as to drive the carrier with the component in a direction parallel to the rotational axis of the rotor.

15 Claims, 8 Drawing Sheets

Related U.S. Application Data

(60) Provisional application No. 61/423,287, filed on Dec. 15, 2010.

(51) Int. Cl.
  *F03D 80/00* (2016.01)
  *F03D 13/10* (2016.01)
  *F03D 80/50* (2016.01)

(52) U.S. Cl.
  CPC .......... *F03D 80/50* (2016.05); *F05B 2230/60* (2013.01); *F05B 2230/61* (2013.01); *Y02E 10/726* (2013.01); *Y02P 70/523* (2015.11)

(56) References Cited

U.S. PATENT DOCUMENTS

| | | | | |
|---|---|---|---|---|
| 7,944,079 | B1* | 5/2011 | Signore | F03D 15/00 290/55 |
| 8,500,400 | B2* | 8/2013 | Signore | B66C 1/108 416/1 |
| 8,721,258 | B2* | 5/2014 | Eriksen | F03D 80/50 415/4.3 |
| 2007/0151194 | A1 | 7/2007 | Livingston et al. | |
| 2007/0200103 | A1* | 8/2007 | Viladomiu i Guarro | B66C 23/207 254/334 |
| 2010/0011575 | A1* | 1/2010 | Numajiri | B66C 17/04 29/889.1 |
| 2010/0275442 | A1 | 11/2010 | Ohl, Jr. | |
| 2012/0125876 | A1* | 5/2012 | Park | F03D 80/50 212/312 |

FOREIGN PATENT DOCUMENTS

| | | |
|---|---|---|
| EP | 2147885 A1 | 1/2010 |
| EP | 2246561 A2 | 11/2010 |
| WO | 2007096008 A1 | 8/2007 |
| WO | 2009074859 A2 | 6/2009 |
| WO | 2010024510 A1 | 3/2010 |
| WO | 2010031528 A2 | 3/2010 |

OTHER PUBLICATIONS

The State Intellectual Property Office of China, 2nd Notification of Office Action in CN Application No. 201180064923.8, dated Oct. 8, 2015.

European Patent Office, Official Action issued in Application No. 11 793 649.2, dated Jun. 1, 2015.

International Bureau, International Preliminary Report on Patentability issued in corresponding PCT Application No. PCT/DK2011/050451 dated Jun. 18, 2013, 9 pages.

Danish Patent Office, DK Search and Examination Report issued in corresponding DK Application No. PA201001126 dated Jul. 22, 2011, 4 pages.

International Searching Authority, Search Report and Written Opinion issued in corresponding PCT/DK2011/050451 dated Apr. 24, 2012, 12 pages.

European Patent Office, European Search Report in EP Applicatio No. 16165517, dated Sep. 21, 2016.

\* cited by examiner

TOOL AND A METHOD FOR MOVING A WIND TURBINE DRIVETRAIN COMPONENT

TECHNICAL FIELD

The invention relates to a tool for moving a drivetrain component in a nacelle of a horizontal axis wind turbine. Normally in horizontal axis wind turbines, a rotor of the wind turbine is rotatably mounted to the nacelle. The component is connected, in operation of the wind turbine, to the rotor.

BACKGROUND

A number of solution have been suggested for handling wind turbine gearboxes, generators and other drivetrain components, e.g., at service or installation, see for example, U.S. Pat. No. 6,232,673, EP1291521, SE428042, EP1101936, U.S. Pat. Nos. 7,735,808, 7,644,482 and US2010062888. U.S. Pat. No. 7,944,079 describes sleds for moving a gearbox in a direction parallel to the rotor rotational axis. WO2009074859 describes a system for moving wind turbine main components in a nacelle, in a direction parallel to the rotor rotational axis, with a rail underneath the components. The system comprises a transport device with height adjustment and lateral adjustment.

Although known solution provide some means of moving drivetrain components in a wind turbine nacelle at service or installation, it would be desirable to improve such means.

SUMMARY

It is an object of the invention to improve the handling of drivetrain components when moving them in horizontal axis wind turbines. Another object is to improve the control of drivetrain components when moving them in horizontal axis wind turbines. Yet another object of the invention is to provide a tool that is flexible and easy to use.

These objects are reached with a tool for moving a drivetrain component in a nacelle of a horizontal axis wind turbine, the nacelle comprising a nacelle structure, the component being connected, in operation of the wind turbine, to a rotor of the wind turbine, the tool comprising at least one drive unit adapted to be connected to the nacelle structure and to the component, directly or via an intermediate item such as a carrier described below, so as to provide a force between the nacelle structure and the component, so as to drive the component in a direction parallel to the rotational axis of the rotor, characterized in that each drive unit is adapted to be selectively connected to the nacelle structure at more than one location.

The component can be moved in relation to the nacelle by means of the drive unit along an elongated support unit, which can be a separate piece adapted to be fixed to the nacelle structure and oriented in parallel to the rotational axis of the rotor. Since, each drive unit is adapted to be selectively connected to the nacelle structure at more than one location, the location of the connection between the nacelle structure and the drive unit can be selected, e.g., depending on the task to be carried out, for example, depending on which component is to be moved. It should be noted that the connection between the nacelle structure and the drive unit can be direct, or provided via some intermediate part adapted to transfer the forces between the drive unit and the nacelle structure. For example, the drive unit can be connected to the nacelle structure via the support unit. The invention can provide a robust, simple solution with a large degree of control during handling of large main components in a wind turbine nacelle.

Preferably, the drive unit is a linear actuator, e.g., in the form of a hydraulic or electric linear actuator, or a screw type actuator, which can be removable.

Preferably, the locations at which each drive unit can be connected to the nacelle structure are distributed in parallel to the support unit.

Preferably, the tool comprises at least one carrier adapted to be connected to the component, to carry the weight of the component, and to be supported by the nacelle structure, the drive unit being adapted to be connected to the component via the carrier. Thereby a force can be provided between the nacelle structure and the carrier, so as to drive the carrier with the component in a direction parallel to the rotational axis of the rotor. Preferably, the carrier comprises a vehicle, also including at least one position adjustment device, further described below, and is adapted to be supported by the nacelle structure directly or via the support unit which is oriented in parallel to the rotational axis of the rotor.

In some embodiments, each drive unit is adapted to be located selectively on a first side of the respective carrier and on a second side of the respective carrier. Thereby, e.g., where the drive unit is a linear actuator, the direction of the linear actuator can be changed.

The objects are also reached with a method for moving a first and a second drivetrain component in a nacelle of a horizontal axis wind turbine, the nacelle comprising a nacelle structure, the components being connected, in operation of the wind turbine, to a rotor of the wind turbine, the method comprising connecting a first drive unit between a first location, fixed to the nacelle structure, and the first component or a first vehicle connected to the first component, moving the first component in relation to the nacelle structure by means of the first drive unit, connecting a second drive unit between a second location, which is different to the first location and fixed to the nacelle structure, and the second component or a second vehicle connected to the second component, and moving the second component in relation to the nacelle structure by means of the second drive unit.

Preferably, the method comprises placing the first vehicle between the first component and the nacelle structure, and connecting the first vehicle to the first component, the step of moving the first component comprising moving the first vehicle with the first component in relation to the nacelle structure by means of the first drive unit, the method further comprising placing the second vehicle between the second component and the nacelle structure, and connecting the second vehicle to the second component, the step of moving the second component comprising moving the second vehicle with the second component in relation to the nacelle structure by means of the second drive unit.

The first and second drive units could be identical or non-identical. Further the first and second vehicles could be identical or non-identical.

Another aspect of the invention provides a method for moving a drivetrain component in a nacelle of a horizontal axis wind turbine, the nacelle comprising a nacelle structure, the component being connected, in operation of the wind turbine, to a rotor of the wind turbine, the method involving use of a carrier comprising a vehicle and a position adjustment device which is adapted move a movable part at least partly vertically, for example, in a vertical or near vertical direction, in relation to the vehicle, the method comprising placing the carrier adjacent the component, subsequently moving by means of the position adjustment device the movable part at least partially upwards so as to abut a support device presented by the component or connected to the component, subsequently loosening the component from its connection to an adjacent drivetrain component or the rotor, e.g., so as for the component to rest on the carrier, and subsequently moving the carrier and the component, by means of a drive unit, in parallel with the rotational axis of the rotor.

Thereby, a simple and flexible solution is provided that allows handling a very heavy component in an easy manner. The movable part abutting the support device will provide for the carrier to support the component. It will also provide for the carrier to reduce the loads on the connection between the component and another adjacent component, so that this connection can be manipulated without problems, e.g., so that connection bolts can be easily taken in or out of flange holes. The same carrier can also be used for carrying the component when it is moved away from or towards the adjacent component. The vehicle of the carrier can be provided in a variety of forms, e.g., as a sled adapted to glide on its supporting surface, or as a cart with wheels.

Preferably, the movable part comprises an intermediate part connected to the position adjustment device, and the step of moving the movable part comprises moving by means of the position adjustment device the intermediate device at least partially upwards so as to abut the support device. Alternatively, the movable part is presented by the position adjustment device, and the step of moving the movable part comprises moving by means of the position adjustment device a part of the position adjustment device at least partially upwards so as to abut the support device. For example, where the position adjustment device is a hydraulic linear actuator presenting a cylinder and a piston in the cylinder, one of the piston rod and the cylinder can be connected to the vehicle, and the other of the piston rod and the cylinder can be moved so as to abut the support device.

Preferably, placing the carrier adjacent the component comprises placing the carrier on a respective elongated support unit. It should be noted that this step can, for example, be carried out at the time of the service or installation operation involving moving the component, or alternatively carrier can the permanently placed adjacent the component, e.g., said placement can be carried out at manufacturing of the with turbine.

Preferably, the drive unit is connected between the carrier and the nacelle structure. This connection can, for example, be carried out at the time of the service or installation operation involving moving the component, or alternatively the drive unit can be permanently installed, e.g., said connection can be carried out at manufacturing of the with turbine.

Preferably, the method comprises connecting the support device to the component, via which support device the component can rest on the carrier.

This aspect also provides a tool for moving a drivetrain component in a nacelle of a horizontal axis wind turbine, the nacelle comprising a nacelle structure, the component being connected, in operation of the wind turbine, to a rotor of the wind turbine, the tool comprising a carrier adapted to carry at least part of the weight of the component, and to be supported by the nacelle structure, e.g., directly or via an elongated support unit, and a drive unit adapted to be connected between the nacelle structure and the carrier or the component for moving the carrier and the component connected to the carrier in relation to the nacelle in a direction parallel to the rotational axis of the rotor, the carrier comprising a vehicle, for example, a sled or a cart with wheels, and a position adjustment device adapted to be located between the vehicle and the component.

Thus, the vehicle can be adapted to be connected to the component via the position adjustment device. As with the method mentioned above, the vehicle and the position adjustment device can reduce the loads on the connection between the component and another adjacent component, so that this connection can be manipulated without problems. The same vehicle can also be used for carrying the component when it is moved away from or towards the adjacent component.

Preferably, the tool comprises two carriers adapted to be located on respective sides of the component, two drive units, each adapted to be connected between the nacelle structure and one of the carriers or the component, and two position adjustment devices each adapted to be located between one of the vehicles and the component.

This aspect also provides a tool for moving a drivetrain component in a nacelle of a horizontal axis wind turbine, the nacelle comprising a nacelle structure, the component being connected, in operation of the wind turbine, to a rotor of the wind turbine, the tool comprising a vehicle and at least one position adjustment device adapted to act between a respective first location on the vehicle, and a respective second location on the component or on an interface portion positioned between the component and the respective position adjustment device, the second location being higher than the first location. Thus, the position adjustment device is arranged to be subjected to a compression force when carrying at least a part of the weight of the component. Thus, as opposed to hanging, the component rests on top of the position adjustment device. Preferably, position adjustment device is a linear actuator, e.g., a hydraulic or an electric linear actuator.

This aspect also provides a tool according to claim 18.

Another aspect of the invention provides a tool for moving a drivetrain component in a nacelle of a horizontal axis wind turbine, the nacelle comprising a nacelle structure, the component being connected, in operation of the wind turbine, to a rotor of the wind turbine, the tool comprising a vehicle, e.g., a sled or a cart, adapted to be connected to the component, to carry at least part of the weight of the component, and to be supported by the nacelle structure, e.g., directly or via an elongated support unit, and a second position adjustment device adapted exert a force between the component and the nacelle structure, e.g., directly or via an intermediate part such as the vehicle, in a horizontal direction perpendicular to the rotational axis of the rotor.

Thereby, lateral movement of component can be conveniently effected for fine adjustment, e.g., during installation of the component.

Preferably, a drive unit is adapted to be connected between the vehicle and the nacelle structure the for moving the vehicle and the component connected to the vehicle in relation to the nacelle in a direction parallel to the rotational axis of the rotor.

Preferably, the second position adjustment device is mounted on the vehicle and is adapted to exert the force between the vehicle and the nacelle structure, e.g., directly or via a supporting unit, so as to move the vehicle and the component laterally.

DESCRIPTION OF THE FIGURES

Below, an embodiment of the invention will be described with reference to the drawings in which.

DETAILED DESCRIPTION

Figure 1:
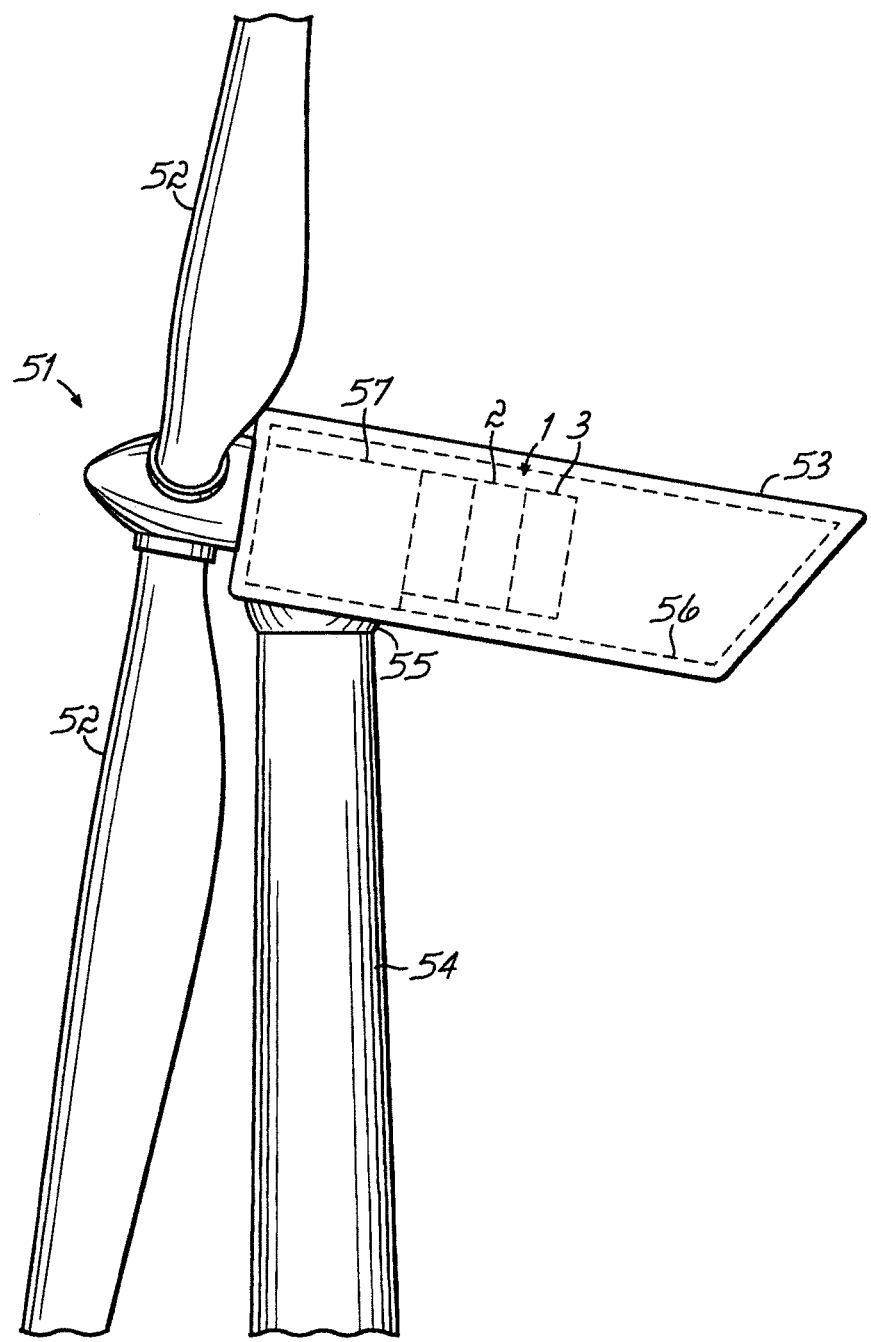
FIG. 1 is a side view of parts of a wind turbine with some hidden parts indicated with broken lines.

FIG. 1 is a side view of parts of a horizontal axis wind turbine comprising a rotor 51, with three blades 52, a nacelle 53 to which the rotor is rotatably mounted and which in turn is mounted on top of a tower 54. The nacelle comprises a nacelle structure including a bedframe 55 rotatably mounted on the tower for yawing, and a nacelle frame 56 connected to the bedframe 55. The rotor is mounted to a main shaft (not shown) which is rotatably mounted to a main shaft housing 57 which in turn is fixed to the bedframe 55. The wind turbine further comprises a drivetrain component 1 in the form of an assembly of a gearbox 2 and a generator 3 in the nacelle 53. It should be noted that for this presentation, the generator is considered as a drivetrain component.

Figure 2:
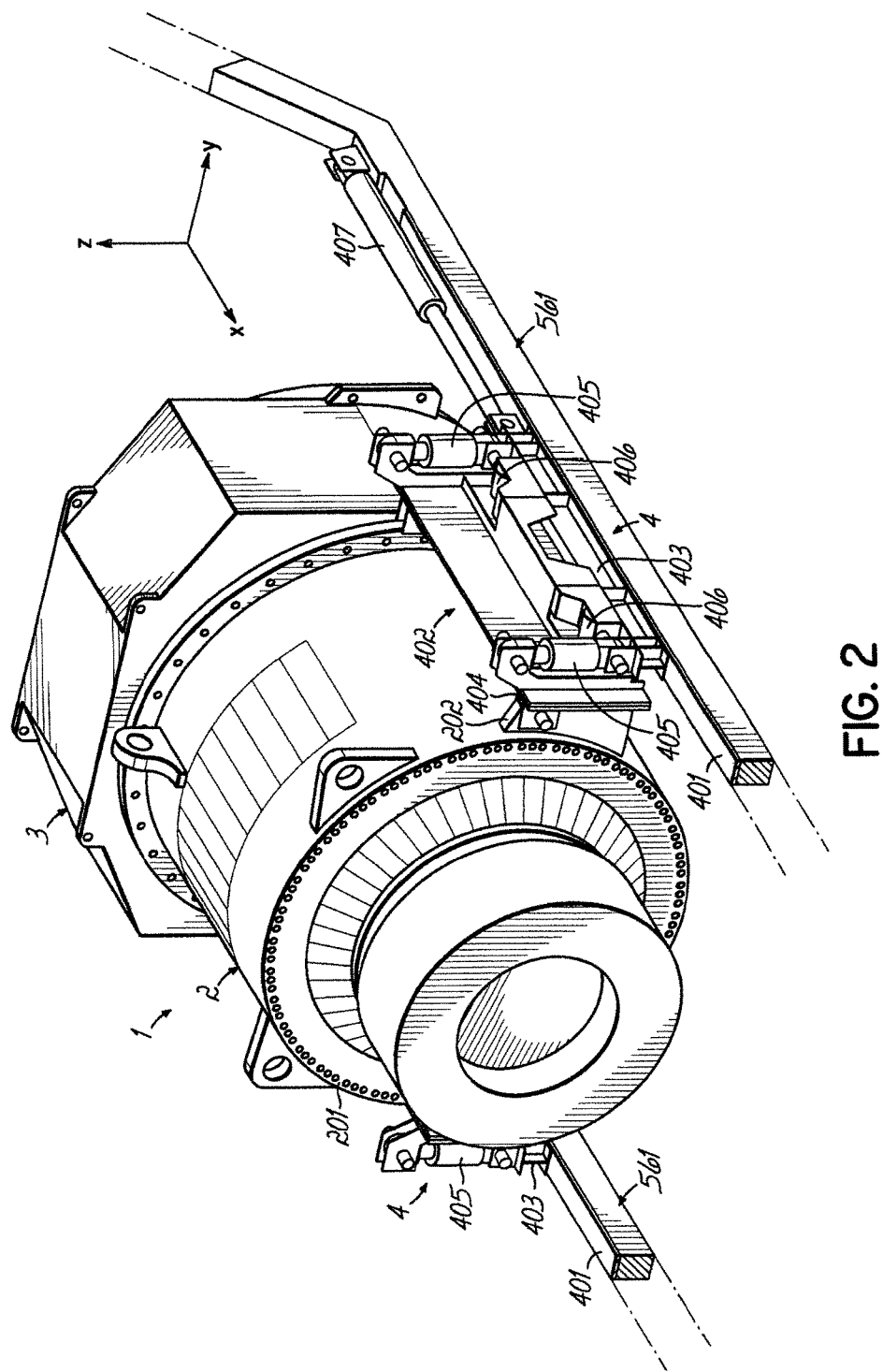
FIG. 2 is a perspective view of a tool according to one embodiment of the invention with a drivetrain component.

FIG. 2 shows the component 1 disassembled from other drive components such as a main shaft (not shown), which is in the operational state of the wind turbine connecting the gearbox and a rotor of the wind turbine, which rotor comprises at least one blade. In the operational state (FIG. 1), the stationary housing of the gearbox 2 is connected to the main shaft housing 57 by means of a flange 201 on the gearbox 2, a cooperating flange on the main shaft housing and bolts connecting the flanges. Since the main shaft housing 57 is mounted on the bedframe 55, the gearbox 2 and the generator 3 are in the mounted state cantilevered from the main shaft housing 57, and connected to the nacelle structure 55, 56 via the main shaft housing 57. As is known in the art, alternatively the gearbox 2 and the generator 3 can have respective direct connections to the nacelle structure 55, 56.

For this presentation, a nacelle fixed coordinate system (see, FIG. 2) is defined as follows: The x-axis is parallel to the rotational axis of the wind turbine rotor, the y-axis is horizontal and perpendicular to the x-axis, and the z-axis that is perpendicular to the x-axis and to the y-axis. (In most horizontal axis wind turbines the rotor axis is inclined, e.g., 10 degrees, to a horizontal plane, and in such a turbine, the x-axis as defined above would of course also be inclined.)

A tool 4 for moving the drivetrain component 1 in the nacelle comprises two supporting units 401 mounted to a respective longitudinal member 561 of the nacelle structure. The support units 401 are elongated, oriented parallel to the x-axis, and distributed in along the y-axis so as to be located on either side of the component 1 in the mounted state thereof. Further in this embodiment the support units 401 are located at a lower portion of the component in the mounted state thereof, and have the shape of flanges 401 protruding from the respective longitudinal member 5 of the nacelle structure.

The tool 4 further comprises two transport assemblies 402 each arranged so as to cooperate with a respective of the support units 401 and thus similarly located on either side of the component 1. Each transport assembly 402 comprises a carrier in turn comprising a vehicle, here embodied as a sled 403. Each carrier also comprises two first position adjustment devices 405, and two second position adjustment devices 406. Each transport assembly 402 also comprises an interface portion 404, for connection to the component, and a drive unit 407.

Figure 3:
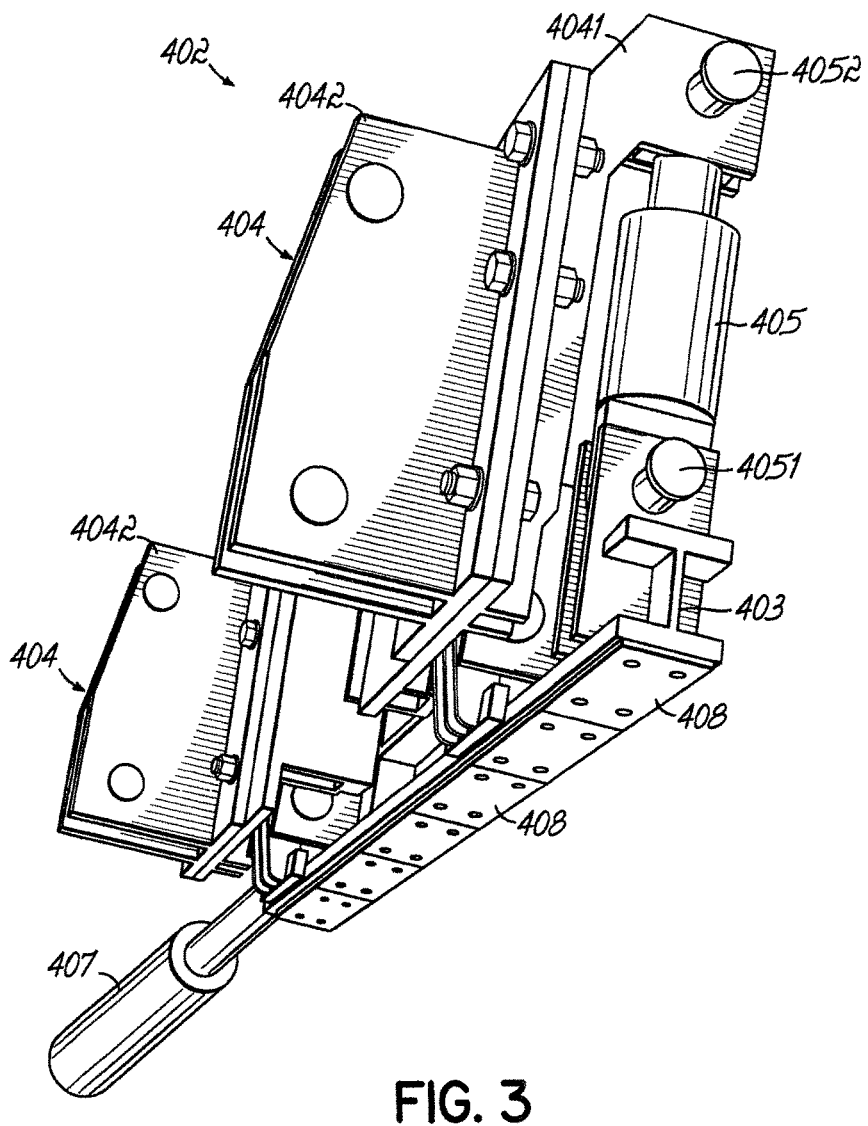
FIG. 3 is a perspective view from underneath of a portion of the tool in FIG. 2.

As can be seen in FIG. 3, each sled 403 has on its surface facing the support unit 401 pads 408 in a low friction material, to facilitate a sliding motion of the sled 403 on the support unit 401. For connecting the transport assembly to the gearbox during a service or installation procedure, the interface portion 404 has flanges for its connection to cooperating flanges 202 (FIG. 2) on the gearbox 2 by means of pins through holes in the flanges. The connection between the sled 403 and the component is described closer below.

The drive units 407 are in the form of linear actuators. Here they are hydraulic linear actuators, but alternatively, they could be electric linear actuators or screw type actuators, e.g., provided with screws extending along the x-axis and engaging female threads in the sleds 403, which would move by twisting the screws. The linear actuators 407 are adapted to be connected to the nacelle structure and to the sled 403, so as to drive the sled 403 with the component in a direction parallel to the rotational axis of the rotor. More particularly, when the gearbox 2 released from the main shaft housing 57, the gearbox and generator assembly 1 can be moved along the x-axis by means on the sleds 403 and the linear actuators 407.

Figure 4:
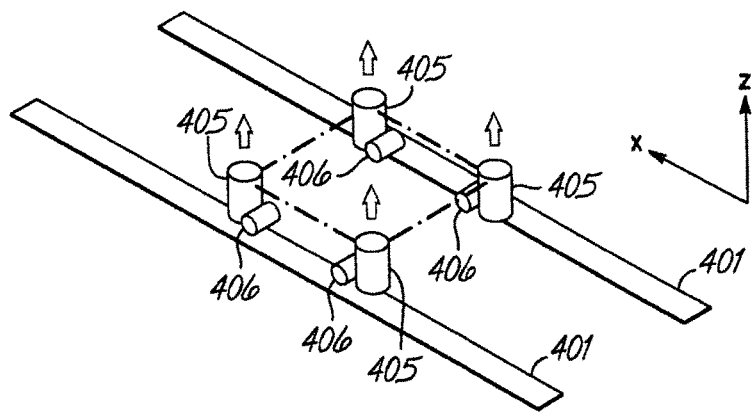
FIG. 4 shows a schematic perspective view of actuators in the tool in FIG. 2.

Reference is also made to FIG. 4. On each transport assembly 402, the position adjustment devices 405, 406, here embodied as hydraulic actuators, are distributed along the x-axis. As can be seen in FIG. 4a, height adjustment, i.e., movement along the z-axis, of the component 1 can be accomplished by simultaneous movement in the same direction of all four first position adjustment devices 405. As can be seen in FIG. 3, each first position adjustment device 405 is a hydraulic linear actuator adapted to act between a first location 4051 on the sled 403 and a second location 4052 on the interface portion 404, the second location being higher than the first location. It should be noted that the position adjustment devices 405, 406 can alternatively be provided as some other type of actuators, e.g., electric linear actuators, or screw type linear actuators, (including screws engaging female threads so as to cause movement by twisting the screws).

Figure 5:
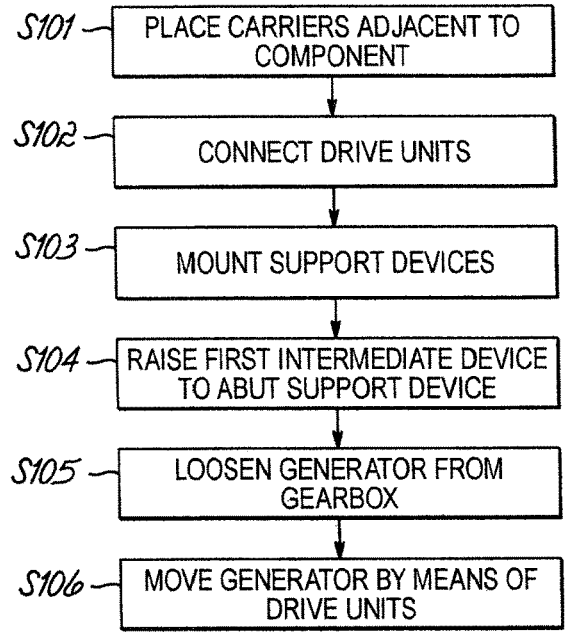
FIG. 5 is a block diagram showing steps in a method according to an embodiment of the invention.
Figure 6:
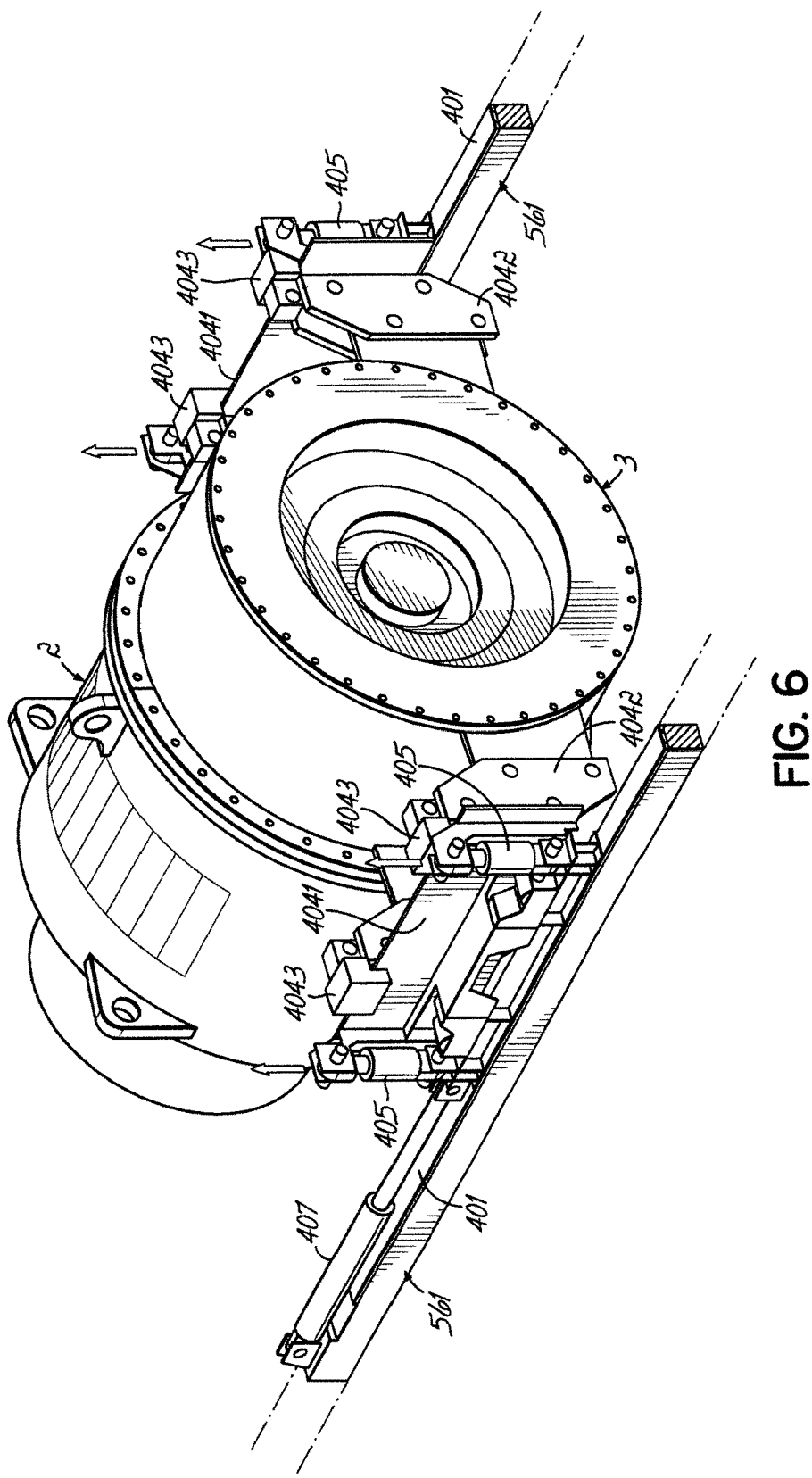
FIG. 6 is a perspective view of the tool with another component.

Now, referring to FIGS. 3, 5 and 6 a method for moving a drivetrain component, in this example the generator 3, will be described. As can be seen in FIG. 3, the interface portion 404 comprises a first intermediate device 4041 to which the first position adjustment devices 405 are connected at said second location 4052. The interface portion 404 also comprises a second intermediate device 4042. When preparing to move the generator 3, the first and second intermediate devices 4041, 4042 are separated from each other. Two second intermediate devices 4042 are mounted to cooperating flanges of the generator, on respective sides thereof. The assembly including the first intermediate device 4041, the first position adjustment devices 405, and the sled 403 is herein referred to as a carrier.

The method includes placing S101 two carriers 403, 405, 4041 adjacent the generator 3, i.e., on a respective of the elongated support units 401, so as to be placed on respective sides of the generator. Thereby the first and second intermediate devices 4041, 4042 are placed next to each other. Thereafter the drive units 407 are connected S102 between the sled and the nacelle structure. In this embodiment, the direction of the drive units 407 is changed depending on the component that is being handled. When the generator only is to be moved, the drive units 407 are placed on a side of the carriers 403, 405, 4041 towards the rotor, but as can be seen in FIG. 2, when the gearbox 2 and the generator 3 are moved simultaneously, the drive units 407 are placed on a side of the carriers away from the rotor.

Subsequently two support devices 4043 are mounted S103 to each intermediate device 4042. The support devices 4043 present portions that protrude over the first intermediate device 4041. Thereafter the first intermediate device 4041 of each carrier 403, 405, 4041 is moved upwards S104 by means of the first position adjustment devices 405 towards so as to abut the support devices 4043. Subsequently the generator 3 is loosened S105 from its connection to the gearbox 2, so as for the component to rest, via the support devices 4043, on the carriers 403, 405, 4041. Thereafter the carriers 403, 405, 4041 with the generator 3 are moved away from the gearbox 2 along the support units 401 by means of the drive units 407.

Of course, for mounting the generator 3 to the gearbox, the steps described above with reference to FIG. 5 are reversed.

It should be noted that the tool 4 could alternatively comprise only one supporting unit 401 mounted underneath the component 1, and only one transport assembly 402, Thereby the first position adjustment devices 405 can be distributed along the x-axis, so that the attitude of the component can be changed.

Figure 7:
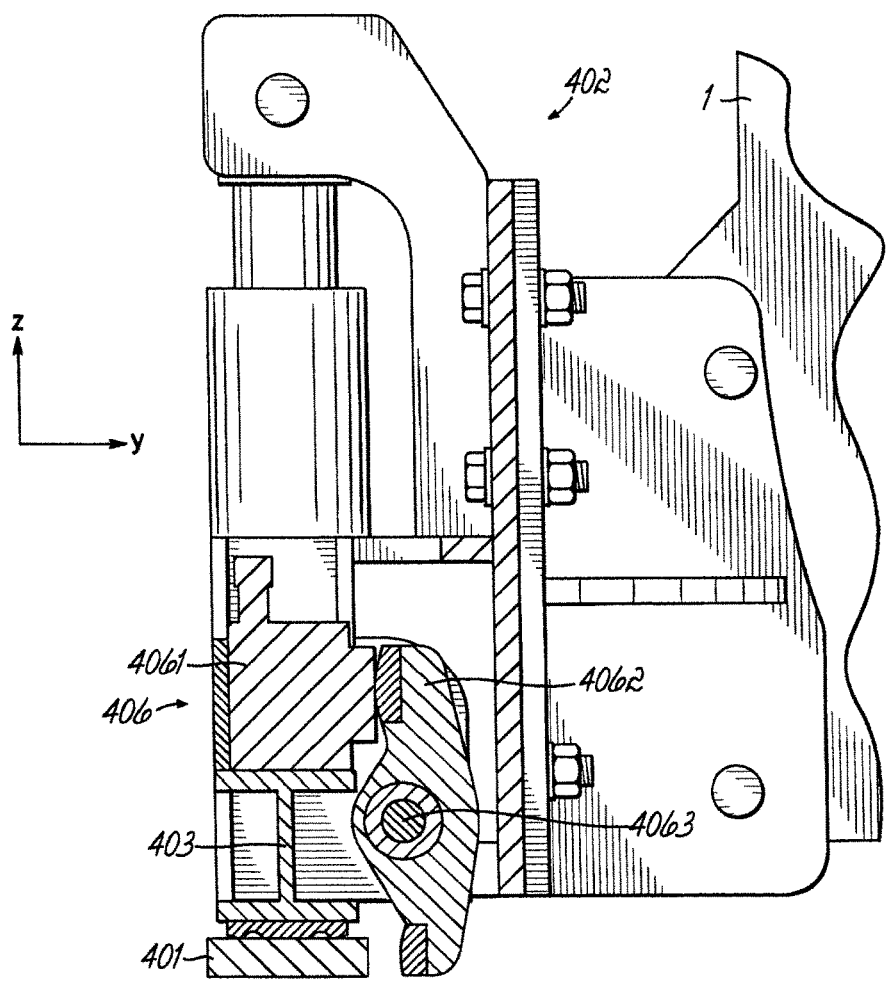
FIG. 7 shows an end view of a portion of the tool in FIG. 2.

Reference is made to FIG. 7. The second position adjustment devices 406 are each adapted to provide a force between the component and the nacelle structure, which force is parallel to the plane defined by the x-axis and the y-axis. Each of the second position adjustment devices 406 comprises a hydraulic actuator 4061 and a lever arm 4062 rotatably mounted, at an articulated joint 4063, to the sled 403. The hydraulic actuator 4061 is adapted to push an upper end of the lever arm 4062 in the direction of the y-axis so a lower end of the lever arm 4062 below the joint 4063 contacts and pushes against the support unit 401, thereby urging the transport assembly 402 and the component 1 in the direction of the y-axis, i.e., laterally. During the resulting movement, the sleds 403 slide laterally on the support units 401.

Figure 8:
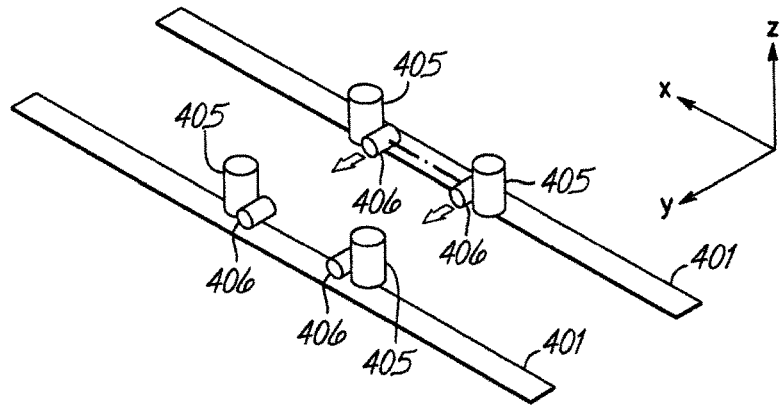
FIG. 8 shows a schematic perspective view of actuators in the tool in FIG. 2.

Reference is made to FIG. 8, showing how the second position adjustment devices 406 are used to control the lateral position of the component. By extending simultaneously the hydraulic actuators 4061 of the second position adjustment devices 406 on the first side of the component 1, and keeping the hydraulic actuators 4061 of the second position adjustment devices 406 on the second side of the component 1 retracted, the component is moved along the y-axis.

In the embodiment described above the first position adjustment devices 405 act between two other parts of the transport assembly 402, namely the sled 403 and the interface portion 404, and the second position adjustment devices 406 act between the transport assembly 402 and the support unit 401. Alternatives are of course possible for the arrangement of the position adjustment devices 405, 406. For example, they could act between the transport arrangement 402 and the component 1, between the transport arrangement 402 and the nacelle structure 56, or even directly between the component 1 and the nacelle structure 56.

Although the examples above show manipulation of an assembly of the gearbox and the generator, and of only the generator, of course the invention can also be used to handle only the gearbox, or some other drivetrain component such as the main shaft.

Figure 11:
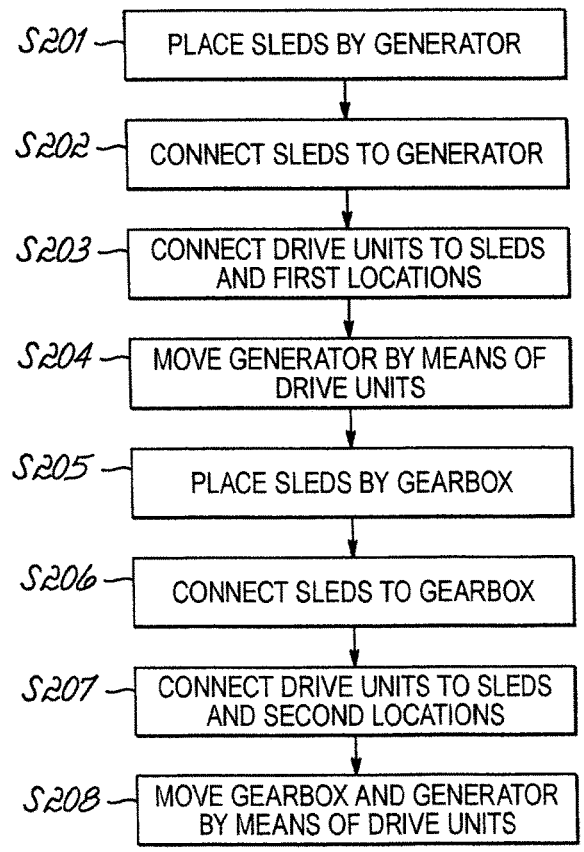
FIG. 11 is a block diagram showing steps in a method according to an embodiment of the invention also depicted in FIGS. 9 and 10.
Figure 9:
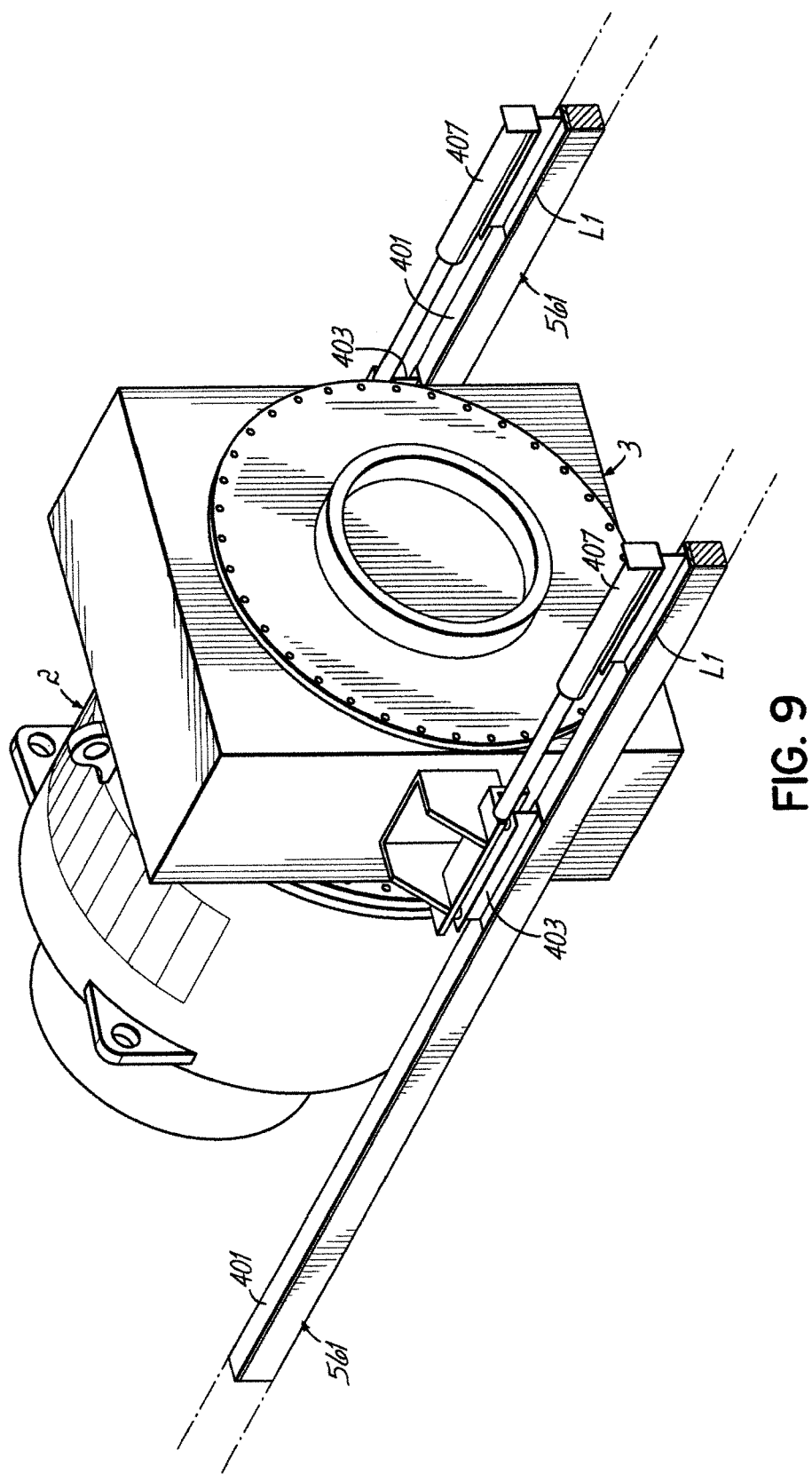
FIG. 9 is a perspective view of a tool according to another embodiment of the invention with a drivetrain component.
Figure 10:
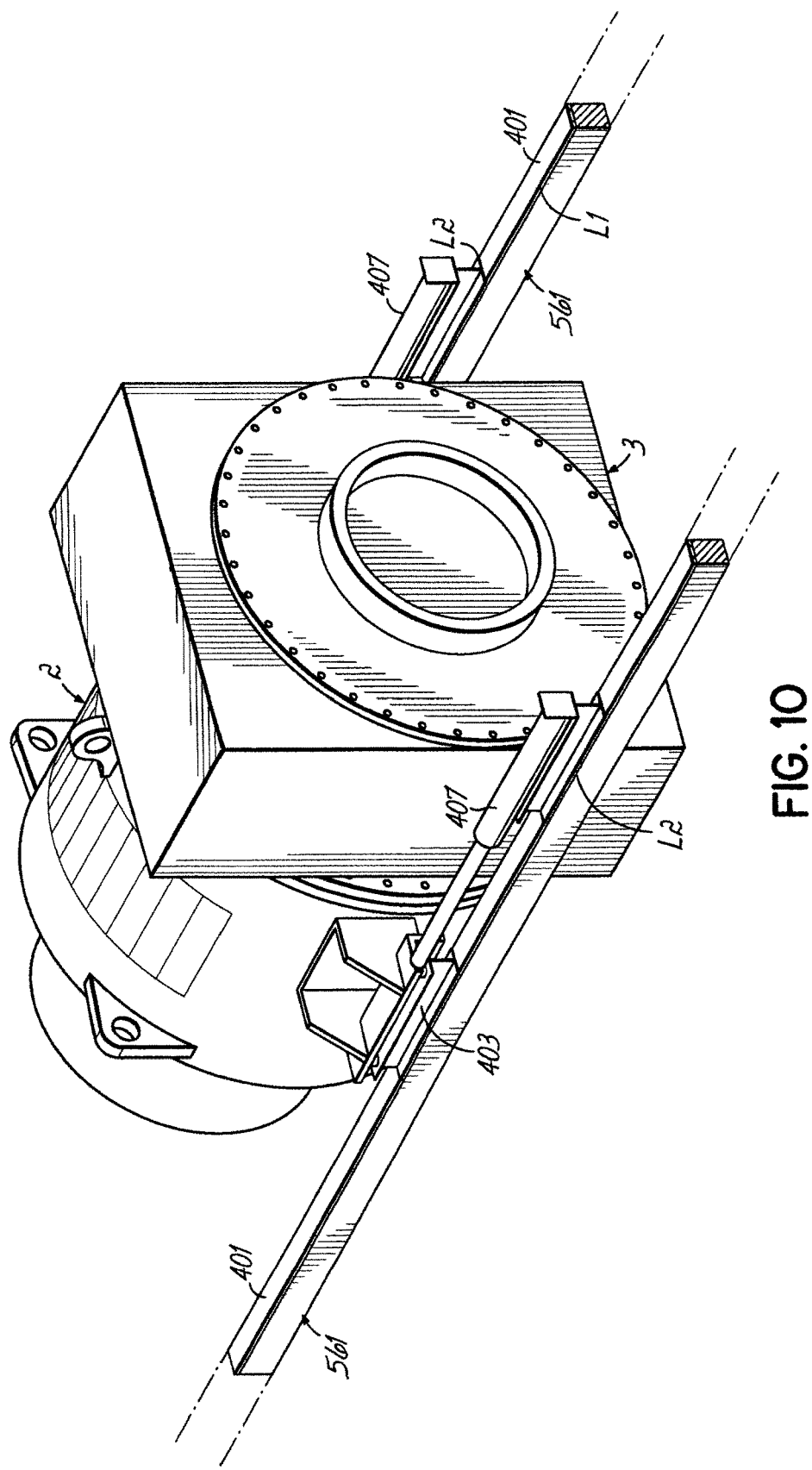
FIG. 10 is a perspective view of the tool on FIG. 9 with another drivetrain component.

Referring to FIGS. 9-11 an embodiment of the invention will be described, in which each drive unit 407 is adapted to be connected to the nacelle structure at more than one location, so that the location of the connection between the nacelle structure and the drive units can be selected depending on the component to be handled. A variation of this solution has already been described above with reference to FIGS. 2, 5 and 6 where the direction of the drive units 407 was changed.

In the method a sled 403 is placed S201 on each side of a first component, in this case the generator 3, between the generator 3 and the nacelle structure. Thereafter the sleds 403 are connected S202 to the generator 3, for example, as described above with reference to FIGS. 5 and 6, and the drive units 407 are connected S203 between the sleds 403 and respective first locations L1 which are fixed in relation to the nacelle structure. Subsequently the sleds and the generator are moved S204 by means of the drive units 407.

For moving the gearbox 2 and the generator together, the sleds 403 are placed S205 on respective sides of the gearbox 2 (FIG. 10), between the gearbox 2 and the nacelle structure. Thereafter the sleds 403 are connected S206 to the gearbox 2, for example, as described above with reference to FIGS. 5 and 6, and the drive units 407 are connected S207 between the sleds 403 and respective second locations L2 which are fixed in relation to the nacelle structure. Subsequently the sleds 403, the gearbox 2 and the generator 3 are moved S208 by means of the drive units 407.

The invention claimed is:
1. A method for moving a first and a second drivetrain component in a nacelle of a horizontal axis wind turbine, the nacelle comprising a nacelle structure, the drivetrain components being connected, in operation of the wind turbine, to a rotor of the wind turbine, the method comprising:
connecting a first drive unit between a first location, fixed to the nacelle structure, and the first drivetrain component or a first vehicle connected to the first drivetrain component, moving the first drivetrain component in relation to the nacelle structure by means of the first drive unit, connecting a second drive unit between a second location, which is different to the first location and fixed to the nacelle structure, and the second drivetrain component or a second vehicle connected to the second drivetrain component, and moving the second drivetrain component in relation to the nacelle structure by means of the second drive unit.

2. The method according to claim 1, comprising:

placing the first vehicle between the first drivetrain component and the nacelle structure, and connecting the first vehicle to the first drivetrain component, the step of moving the first drivetrain component comprising moving the first vehicle with the first drivetrain component in relation to the nacelle structure by means of the first drive unit, the method further comprising:

placing the second vehicle between the second drivetrain component and the nacelle structure, and connecting the second vehicle to the second drivetrain component, the step of moving the second drivetrain component comprising moving the second vehicle with the second drivetrain component in relation to the nacelle structure by means of the second drive unit.

3. The method according to claim 1, wherein the first and second drive units are identical, and/or the first and second vehicles are identical.

4. A method for moving a drivetrain component in a nacelle of a horizontal axis wind turbine, the nacelle comprising a nacelle structure, the component being connected, in operation of the wind turbine, to a rotor of the wind turbine, the method involving use of a carrier comprising a vehicle and a position adjustment device which is adapted move a movable part at least partly vertically in relation to the vehicle, the method comprising:

placing the carrier adjacent the component, subsequently moving by means of the position adjustment device the movable part at least partially upwards so as to abut a support device presented by the component or connected to the component, subsequently loosening the component from its connection to an adjacent drivetrain component or the rotor, and subsequently moving the carrier and the component, by means of a drive unit, in parallel with the rotational axis of the rotor.

5. The method according to claim 4, wherein the movable part comprises an intermediate part connected to the position adjustment device, and the step of moving the movable part comprises moving by means of the position adjustment device the intermediate device at least partially upwards so as to abut the support device.

6. The method according to claim 4, wherein the movable part is presented by the position adjustment device, and the step of moving the movable part comprises moving by means of the position adjustment device a part of the position adjustment device at least partially upwards so as to abut the support device.

7. The method according to claim 4, wherein placing the carrier adjacent the component comprises placing the carrier on a respective elongated support unit.

8. The method according to claim 4, comprising connecting the support device to the component.

9. A tool for moving a drivetrain component in a nacelle of a horizontal axis wind turbine, the nacelle comprising a nacelle structure, the drivetrain component being connected, in operation of the wind turbine, to a rotor of the wind turbine, the tool comprising:

a carrier adapted to carry at least part of the weight of the drivetrain component, and to be supported by the nacelle structure, and a drive unit adapted to be connected between the nacelle structure and the carrier or the drivetrain component for moving the carrier and the drivetrain component connected to the carrier in relation to the nacelle in a direction parallel to the rotational axis of the rotor, the carrier comprising a vehicle and a position adjustment device adapted to be located between the vehicle and the drivetrain component.

10. The tool according to claim 9, comprising:

two carriers adapted to be located on respective sides of the drivetrain component, two drive units, each adapted to be connected between the nacelle structure and one of the carriers or the drivetrain component, and two position adjustment devices each adapted to be located between one of the vehicles and the drivetrain component.

11. A tool for moving a drivetrain component in a nacelle of a horizontal axis wind turbine, the nacelle comprising:

a nacelle structure, the drivetrain component being connected, in operation of the wind turbine, to a rotor of the wind turbine, the tool comprising a vehicle, and at least one position adjustment device adapted to act between a respective first location on the vehicle, and a respective second location on the drivetrain component or on an interface portion positioned between the drivetrain component and the respective position adjustment device, the second location being higher than the first location.

12. The tool according to claim 11, wherein the position adjustment device is a linear actuator.

13. A tool for moving a drivetrain component in a nacelle of a horizontal axis wind turbine, the nacelle comprising a nacelle structure, the drivetrain component being connected, in operation of the wind turbine, to a rotor of the wind turbine, the tool comprising:

a vehicle adapted to be connected to the drivetrain component, to carry at least part of the weight of the drivetrain component, and to be supported by the nacelle structure, and a position adjustment device adapted exert a force between the drivetrain component and the nacelle structure in a horizontal direction perpendicular to the rotational axis of the rotor.

14. The tool according to claim 13, wherein a drive unit is adapted to be connected between the vehicle and the nacelle structure the for moving the vehicle and the drivetrain component connected to the vehicle in relation to the nacelle in a direction parallel to the rotational axis of the rotor.

15. The tool according to claim 13, wherein the position adjustment device is mounted on the vehicle and is adapted to exert the force between the vehicle and the nacelle structure.

* * * * *